May 16, 1961 J. J. SMITH ET AL 2,984,722
MOTOR STARTER SWITCH
Filed Sept. 23, 1958

INVENTORS
JAMES J. SMITH
ROBERT E. PROUTY
JOSEPH A. KIERANS

BY Robert D. Sommer
AGENT

United States Patent Office

2,984,722
Patented May 16, 1961

2,984,722

MOTOR STARTER SWITCH

James J. Smith, Robert E. Prouty, and Joseph A. Keirans, Logansport, Ind., assignors to Essex Wire Corporation Filed Sept. 23, 1958, Ser. No. 762,799

9 Claims. (Cl. 200—113)

This invention relates to a motor starting switch and more particularly to a thermally responsive switch for controlling the starting circuit of a split-phase type electric motor.

It is common practice to employ starting switches with single-phase alternating current motors to deenergize the starting winding of the motor after it has attained sufficient speed to continue running with only the running winding energized. Because of their low cost, thermally responsive switches having a bimetal member connected in the motor circuit are commonly employed to control energization of the starting winding. A pair of normally engaged contacts connected in the starting winding circuit are disengaged by the bimetal member after sufficient time has elapsed for the motor to come up to speed.

One disadvantage of thermally responsive switches of the above character is that under certain conditions they permit a stalled motor to be connected to an electric power source without its starting winding being connected. This may occur with an overloaded motor which has not come up to speed when the starting winding contacts are disengaged or it may result from failure or interruption of the electric power source for a time interval sufficient for the motor to stop but not long enough for the bimetal member to cool sufficiently to close the starting winding contacts. To protect the motor windings from damage under these conditions, it is accepted practice to employ a second thermally responsive switch which will disconnect the motor from the power source upon continued excessive motor current flow and will not reconnect it until after the first thermally responsive switch has had time to cool sufficiently to close the starting winding contacts. The provision of this second switch increases the cost of the motor control even when it is combined with the first thermally responsive switch since at least a second set of contacts is required.

Accordingly, it is an object of the present invention to provide a thermally responsive switch of the foregoing character having only one set of contacts yet which will not permit a stalled motor to remain connected to its electric power source with its starting winding disconnected.

Another object is to provide an improved thermally responsive switch of the foregoing character having normally disengaged contacts which are automatically closed to energize the starting winding of a motor upon connection of the motor to an electric power source, which are automatically reopened after sufficient time has elapsed for the motor to come up to speed, and which are automatically reclosed to permit the motor to start again if it is stopped.

A further object is to provide an improved motor starting switch of the above character which is of simple construction and few parts and which may be easily and inexpensively manufactured.

Other objects and advantages of the invention will be apparent from the following description and accompanying drawing in which.

Figure 1:
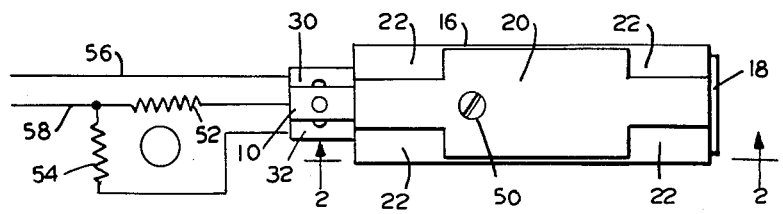
Figure 1 is a plan view of a motor starting switch embodying the present invention and connected in a motor circuit.

Referring now to the drawing, the switch has a pair of bimetal blades 10 and 12 interleaved and supported between insulators 14. This stack of insulators and bimetal blades is mounted in the open end of an enclosure consisting of a metal channel-shaped case 16 with end wall 18 and an insulating plate 20 supported upon the stack and the edge of end wall 18. Four ears 22 formed integrally with case 16 are bent over plate 20 to clamp the switch parts in assembled relation. The case, insulators and blades may have interfitting apertures and projections to insure their permanent alignment.

Figure 2:
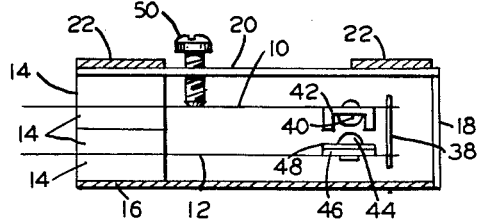
Figure 2 is a sectional view of the switch taken along the line 2—2 of Figure 1.
Figure 5:
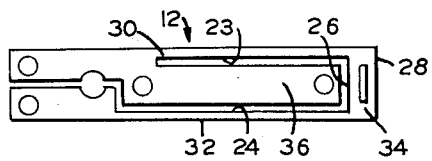
Figures 5 and 6 are plan views of bimetal blades employed in the switch.
Figure 6:
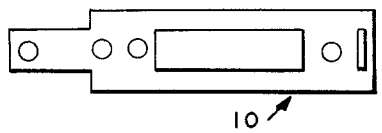

Bimetal blades 10 and 12 are each composed of superposed layers of metals having different coefficients of expansion with the high expanding layer on the upper side of each blade as seen in Figure 2. Blades 10 and 12 are substantially equal in thickness and length to automatically compensate for changes in ambient temperature. As shown in Figure 5, bimetal blade 12 has a pair of longitudinal slots 23 and 24 and a transverse slot 26 connecting the ends of slots 23 and 24 adjacent the free end of blade 12. These slots divide blade 12 into a U-shaped member 28 having a pair of parallel arms 30 and 32 connected by a neck portion 34 and a centrally disposed tongue 36 integrally connected to arm 30. Neck portion 34 of bimetal blade 12 and the free end of bimetal blade 10 are mechanically connected by an actuator 38 of insulating material to move conjointly. Attached to bimetal blade 10 is a contact 40 which is preferably mounted on the face of a permanent magnet 42. A cooperating contact 44 is attached to the free end of tongue 36 and is preferably mounted upon an armature 46 of steel or other magnetizable material. A thin disc 48 of non-magnetic material may be positioned upon the face of the armature 46 adjacent permanent magnet 42 to prevent sticking of the armature on the magnet. Threaded through insulating plate 20 is an adjusting screw 50 which engages bimetal blade 10 for varying the temperature at which the switch is operated by bimetal 12.

As shown in Figure 1, the switch is connected in the circuit of split-phase motor with bimetal blade 10 in circuit with the starting winding 52 of the motor and contact arm 32 in circuit with the running winding 54 of the motor. One line 56 of an alternating current power source is connected to the other contact arm 30 of blade 12 while the other line 58 of the power source is connected to the junction of the other ends of the two windings.

Figure 3:
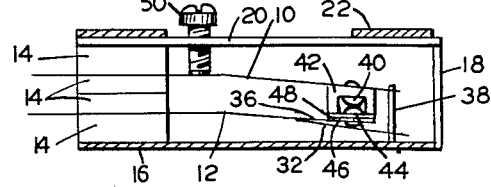
Figures 3 and 4 are sectional views similar to Figure 2 illustrating operation of the switch.

When the power lines 56 and 58 are not energized, blades 10 and 12 are normally in the position illustrated in Figure 2 with contacts 40 and 44 separated. When lines 56 and 58 are energized to operate the motor, the current flows from line 56 to line 58 through arm 30, neck portion 34, arm 32, and the running winding 54. As the starting winding 52 is disconnected from the line, the running winding current will have a high value and rapidly heats the U-shaped member 28 which bends downwardly. The free end of bimetal blade 10 which is biased toward blade 12 by screw 50 will also move downward conjointly with member 28. Tongue 36 remains substantially in its original position as no heating current is passing through it and upon sufficient movement of blades 10 and 12 to the position illustrated in Figure 3, contacts 40 and 44 will engage with a snap action due to attraction of armature 46 by permanent magnet 42.

Figure 4:
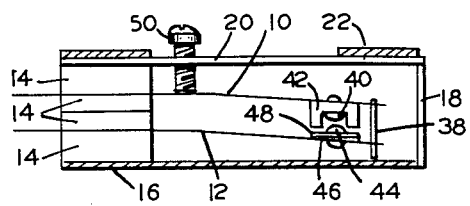

With contacts 40 and 44 engaged, current will also flow through blade 10 and tongue 36 of bimetal blade 12 to energize starting winding 52. The starting winding current heats tongue 36 which tends to deflect away from blade 10 which has a comparatively low resistance and is not appreciably heated by the starting winding current. After a time interval during which the motor should normally attain proper running speed, the tongue 36 becomes sufficiently heated to pull armature 46 away from magnet 42 as shown in Figure 4 and thereby effects a quick separation of contacts 40 and 44 to open the circuit of the starting winding. The running winding current meanwhile has decreased to a low value and both U-shaped member 28 and tongue 36 will cool to return to approximately the position shown in Figure 2. When the motor circuit is opened and the motor stops or if the motor becomes stalled while running, the switch is in position to repeat the above described cycle to restart the motor. In the event the motor has not started when contacts 40 and 44 separate during the starting cycle, the high current of the running winding will maintain the U-shaped member 28 in the position shown in Figures 3 and 4 until tongue 36 cools to reclose contacts 40 and 44 for starting of the motor.

While the invention has been illustrated and described in its preferred embodiment and has included certain details, it should be understood that the invention is not to be limited to the precise details herein illustrated and described since the same may be carried out in other ways falling within the scope of the invention as claimed.

What is claimed is:

1. A starting switch for a motor having starting and running windings comprising a support, a substantially U-shaped bimetal member having a pair of coplanar arms secured to said support, a bimetal tongue secured to said support and disposed between said arms to bend in the same direction when heated, a flexible blade secured to said support and extending in substantially parallel spaced relation to said bimetal tongue, an actuator of insulating material disposed between the free ends of said bimetal member and said flexible blade, a first electric contact carried by the free end of said bimetal tongue, a second electric contact carried by said flexible blade for cooperation with said first contact, said contacts being normally separated, said U-shaped member being arranged to deflect in a direction away from said flexible blade upon current flow through said bimetal member, said flexible blade being biased to move conjointly with said bimetal member to cause said second contact to engage said first contact upon sufficient heating of said bimetal member, and said bimetal tongue being disposed to deflect away from said flexible blade and thereby separate said contacts upon being sufficiently heated by current flow therethrough.

2. The starting switch as defined in claim 1 wherein said bimetal tongue is integrally joined with one arm of said bimetal member adjacent its supported end, and said bimetal member is heated by its resistance to current flow therethrough.

3. The starting switch as defined in claim 1 wherein said flexible blade is formed of a bimetal material having substantially lower resistance than said bimetal tongue, said flexible blade being disposed to deflect in the same direction as said bimetal member and tongue in response to a change in ambient temperature.

4. The starting switch as defined in claim 1 wherein said bimetal tongue and said flexible blade are provided with means including a permanent magnet and a cooperating armature to effect quick engagement and separation of said contacts.

5. A thermostatic control switch comprising an elongated flexible blade and two elongated individually heated thermostatic elements disposed in substantially side-by-side relationship with one set of adjacent ends fixed and the other set of adjacent ends free, said two thermostatic elements being disposed so that they deflect in the same direction upon being heated, means connecting the free end of one thermostatic element to the free end of said flexible blade for conjoint movement thereof, the other thermostatic element and said flexible blade each having an electric contact, said one thermostatic element being operative when heated to move one contact into engagement with the other contact, and said other thermostatic element being operative when heated to move said other contact away from said one contact.

6. The thermostatic control switch according to claim 5 wherein said flexible blade and said other thermostatic element have cooperating magnetic means to effect quick engagement and separation of said contacts.

7. A thermostatic control switch of the stacked type comprising an elongated individually heated flexible blade and two elongated bimetal members disposed in substantially side-by-side relationship with one set of adjacent ends fixed and the other set of adjacent ends free, said two bimetal members being disposed so that they deflect in the same direction upon being heated, means connecting the free end of one bimetal member to the free end of said flexible blade for conjoint movement thereof, the other bimetal member and said flexible blade each having an electric contact, said one bimetal member being operative when heated to move one contact into engagement with the other contact, said other bimetal member being operative when heated to move said other contact away from said one contact, said other bimetal member being heated by its resistance to current flow therethrough, and cooperative magnetic means carried by said flexible blade and said other bimetal member and including a permanent magnet and a cooperating armature to effect quick engagement and separation of said contacts.

8. The thermostatic control switch according to claim 7 wherein said one bimetal member is U-shaped and said one bimetal member being heated in response to current flow therethrough.

9. A starting switch for an electric motor having starting and running circuits comprising a first member adapted for connection in said running circuit and formed of material capable of flexing under heating due to its resistance to current flow, a second member of flexible material provided with an electric contact, means connecting a free end of said first member to a free end of said second member for conjoint movement thereof, a third member provided with a contact and formed of material capable of flexing under heating due to its resistance to current flow, said first and third members being arranged to flex in the same direction when heated, means for connecting said second and third members and said contacts in said starting circuit, said first member being responsive to current flow therethrough to cause said contact on said second member to engage said contact on said third member, said third member being responsive to current flow therethrough to move said contact thereon away from said contact on said second member, and said second and third members being provided with snap-acting means to effect quick engagement and separation of said contacts.

References Cited in the file of this patent

UNITED STATES PATENTS

| | | |
|---|---|---|
| 2,311,048 | Harrold | Feb. 16, 1943 |
| 2,320,117 | Ayers | May 25, 1943 |
| 2,475,038 | Lucas | July 5, 1949 |
| 2,609,466 | Blonder | Sept. 2, 1952 |
| 2,828,389 | Ellenberger | Mar. 25, 1958 |